US008186211B2

(12) United States Patent
Boult et al.

(10) Patent No.: US 8,186,211 B2
(45) Date of Patent: May 29, 2012

(54) IN-BOREHOLE GAS MONITOR APPARATUS AND METHOD

(75) Inventors: Steve Boult, Manchester (GB); Nathan Boyd, Manchester (GB)

(73) Assignee: Intelisys Limited, Manchester (GB)

( * ) Notice: Subject to any disclaimer, the term of this patent is extended or adjusted under 35 U.S.C. 154(b) by 723 days.

(21) Appl. No.: 12/304,149

(22) PCT Filed: Jun. 6, 2007

(86) PCT No.: PCT/GB2007/002061
§ 371 (c)(1),
(2), (4) Date: Dec. 10, 2008

(87) PCT Pub. No.: WO2007/141512
PCT Pub. Date: Dec. 13, 2007

(65) Prior Publication Data
US 2009/0266154 A1    Oct. 29, 2009

(30) Foreign Application Priority Data

Jun. 10, 2006   (GB) .................................. 0611527.3

(51) Int. Cl.
*E21B 49/08* (2006.01)
(52) U.S. Cl. .................................................. 73/152.27
(58) Field of Classification Search ............... 73/152.27, 73/152.28
See application file for complete search history.

(56) References Cited

U.S. PATENT DOCUMENTS

| 4,010,642 | A | * | 3/1977 | McArthur ................... 73/152.51 |
| 4,112,302 | A |   | 9/1978 | Flanagan et al. |
| 4,414,846 | A |   | 11/1983 | Dublin, Jr. et al. |
| 4,669,554 | A | * | 6/1987 | Cordry ............................... 175/59 |
| 4,717,473 | A | * | 1/1988 | Burge et al. .............. 210/170.07 |
| 4,827,246 | A | * | 5/1989 | Dolan et al. ................... 340/521 |
| 5,010,776 | A | * | 4/1991 | Lucero et al. ............... 73/863.23 |
| 5,616,841 | A | * | 4/1997 | Brookshire ................. 73/152.29 |
| 6,098,448 | A | * | 8/2000 | Lowry et al. ...................... 73/38 |
| 6,216,532 | B1 | * | 4/2001 | Stephenson et al. ........ 73/152.21 |
| 6,356,205 | B1 | * | 3/2002 | Salvo et al. ................. 340/853.3 |
| 6,371,204 | B1 | * | 4/2002 | Singh et al. .............. 166/250.03 |
| 6,474,176 | B1 | * | 11/2002 | Gee et al. ..................... 73/861.63 |
| 6,487,920 | B1 | * | 12/2002 | Robbat, Jr. ................... 73/863.12 |
| 6,995,360 | B2 | * | 2/2006 | Jones et al. .................. 250/269.1 |
| 7,003,405 | B1 | * | 2/2006 | Ho ................................... 702/32 |
| 7,339,168 | B2 | * | 3/2008 | May .......................... 250/338.5 |
| 2010/0011853 | A1 | * | 1/2010 | Anthony et al. ........... 73/152.02 |

FOREIGN PATENT DOCUMENTS

| GB | 2402476 | 12/2004 |
| JP | 2003185540 A | * 7/2003 |
| WO | WO9218750 | 10/1992 |

* cited by examiner

*Primary Examiner* — John Fitzgerald
(74) *Attorney, Agent, or Firm* — Trego, Hines & Ladenheim, PLLC

(57) ABSTRACT

A self-contained in-borehole gas monitor (IGM) apparatus (8) comprising a detector for measuring a gas variable, and a controller (54) configured to automatically periodically use the detector to measure a gas variable.

29 Claims, 2 Drawing Sheets

IN-BOREHOLE GAS MONITOR APPARATUS AND METHOD

FIELD OF THE INVENTION

The present invention relates to in-borehole gas monitor (IGM) apparatus and methods.

BACKGROUND TO THE INVENTION

The monitoring of gas concentrations, and in particular methane and carbon dioxide, generated by landfill and associated sites is becoming a more common legislative requirement due to the potential problems these gases pose, such as the risk of explosion and migration into buildings. At present, the majority of landfill gas analysis is achieved either through spot sampling of through the use of large expensive fixed position monitoring stations. More recently it has been recognised that gas production and migration responds to environmental factors such as barometric pressure and groundwater movement, with the accompanying realisation that spot sampling will often miss such changes.

It is an aim of preferred embodiments of the present invention to address, overcome or obviate a disadvantage of the prior art, whether such prior art or disadvantage is referred to herein or otherwise.

SUMMARY OF THE INVENTION

According to the present invention in a first aspect, there is provided a self-contained in-borehole gas monitor (IGM) apparatus comprising a detector for measuring a gas variable, and a controller configured to automatically periodically use the detector to measure a gas variable.

The gas variable can, without limitation, be one of the presence or absence of a particular gas, a gas concentration level, a gas pressure, a gas temperature, etc.

Suitably, the IGM apparatus further comprises a through vent pipe and a vent valve for controllably opening the vent pipe, which vent pipe, when open, provides a gas flow path to the exterior of the IGM apparatus. In use, this provides a mechanism for the borehole gases to be vented to atmosphere and borehole gas to equilibriate with atmospheric gases. Suitably, the IGM apparatus is configured to automatically periodically open the vent valve.

Suitably, the IGM apparatus is configured to be locatable substantially within a borehole liner. Suitably, the IGM apparatus is configured whereby the majority of the volume of the IGM apparatus is locatable within a borehole liner. Suitably, the IGM apparatus is configured whereby over 75% of the volume of the IGM apparatus is locatable within a borehole liner. Suitably, the IGM apparatus is configured whereby over 90% of the volume of the IGM apparatus is locatable within a borehole liner. Suitably, the IGM apparatus comprises a body portion for location within a borehole liner, which body portion is no more than 50 mm across.

Suitably, the IGM apparatus comprises a power cell.

Suitably, the IGM apparatus comprises a gas flow path from a gas entry region to a gas variable detector. Suitably, a gas pressure sensor is configured to measure the gas pressure in the gas flow path. Suitably, the gas flow path is from the gas entry region to the gas entry region. That is, the tested gas is re-circulated back to the borehole in use. Suitably, the IGM apparatus comprises an entry valve configured to control gas flow into the gas flow path. Suitably, the IGM apparatus comprises an exit valve configured to control gas flow out of the gas flow path. Suitably, the IGM apparatus comprises a pump configured to pump gas from a gas entry region of the IGM apparatus to a gas variable detector. Suitably, the pump is configured to pump a tested gas away from the gas variable detector.

Suitably, the IGM apparatus comprises a pressure sensor configured to measure atmospheric pressure in use.

Suitably, the IGM apparatus further comprises a water detector configured to detect liquid water in or in the proximity of the IGM apparatus, and whereby the controller is configured to undertake a water detection response if liquid water is detected. The water detection response may be to shut down the IGM apparatus, to transmit a warning signal, to illuminate a warning light or otherwise.

Suitably, the IGM apparatus further comprises an on-board memory to store data generated by the IGM apparatus.

Suitably, the IGM apparatus further comprises a filter before the entry to the gas flow path for filtering one or more of particulates and moisture.

Suitably, the IGM apparatus further comprises a borehole cap for securing the IGM apparatus to a borehole lining. Suitably, there is provided a gas-tight seal between borehole cap and the borehole lining. It will be appreciated that a "gas-tight" seal may not prevent the leakage of all gases entirely, but reduces them to an extent that measurements are not materially affected.

Suitably, the IGM apparatus comprises a gas flow path from a gas entry region to a gas variable sensor, an entry valve for controlling gas entry to the gas flow path, an exit valve for controlling gas exit from the end of the gas flow path distal from the gas entry and a pump for pumping borehole gas into the gas variable sensor.

Suitably, the IGM apparatus is configured to take an atmospheric pressure reading and a borehole pressure reading at the same time. It will be appreciated that a reading "at the same time" may not be exactly simultaneously, but will be within a close enough time-window to allow the pressures to be considered to be at the same time for analysis purposes.

Suitably, the IGM apparatus comprises means for communicating data externally of the apparatus.

Suitably, the IGM apparatus is portable. By "portable" we mean that is can be carried by hand by a user.

Suitably, the IGM apparatus comprises a water level detector. Suitably, the water level detector comprises a wired pressure transducer. Suitably, the water level detector is connected to the bottom of the IGM apparatus to be suspended into the borehole in use.

According to the present invention in a second aspect, there is provided a self-contained in-borehole gas monitor (IGM) method comprising a controller configured to automatically periodically measure a gas variable.

BRIEF DESCRIPTION OF THE DRAWINGS

The present invention will now be described, by way of example only, with reference to the drawings that follow; in which.

DESCRIPTION OF THE PREFERRED EMBODIMENTS

Figure 1:
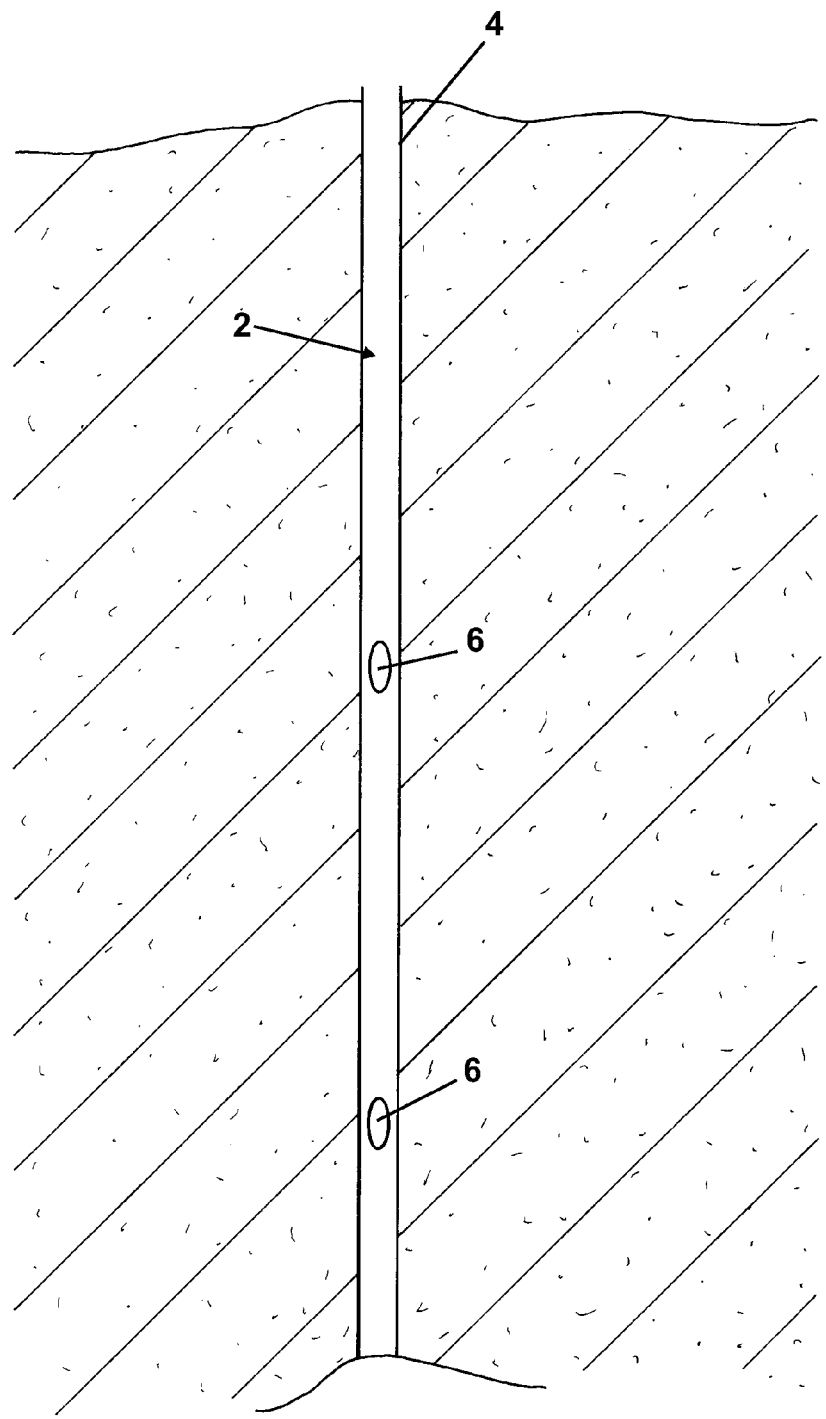
FIG. 1 is a schematic illustration of a borehole site with an in-borehole gas monitor according to the present invention.

Referring to FIG. 1 of the accompanying drawings, there is shown a borehole 2 in ground consisting of a landfill site. The borehole 2 is supported by a liner 4 in which a plurality of side-holes 6 are located to allow for sampling.

Figure 2:
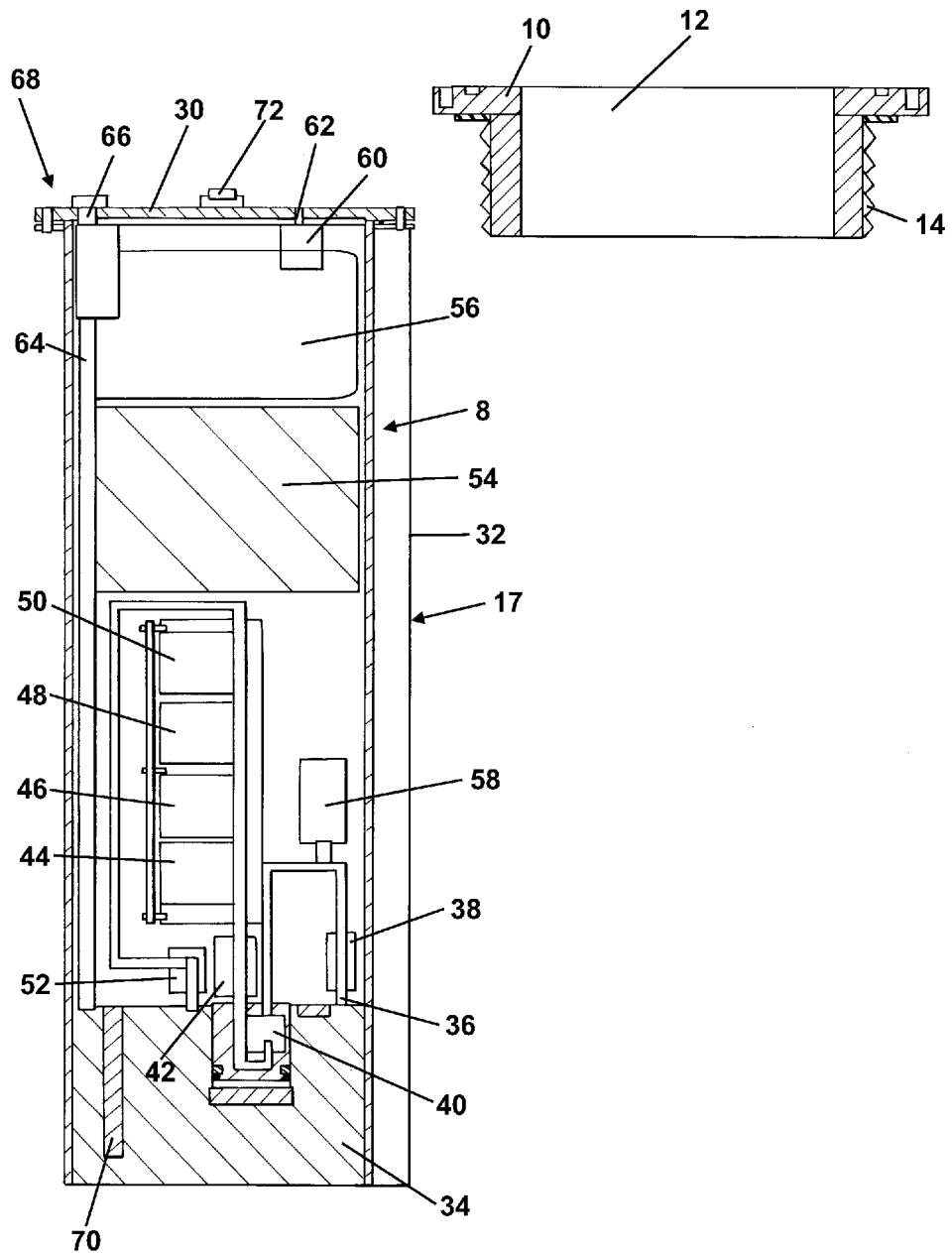
FIG. 2 is a schematic cross-sectional elevation of an in-borehole gas monitor apparatus according to the present invention.

Referring to FIG. 2 of the accompanying drawings, there is shown an in-borehole gas monitor (IGM) apparatus 8 including a cap 10. The cap 10 comprises an inner bore 12 for receiving the IGM apparatus 8. The cap 10 includes an exterior screw thread 14 for engaging with a corresponding interior screw thread (not shown) on liner 4. Alternatively, the cap can be made as part of the housing. A seal 16 is provided for fitting the IGM apparatus 8 in a borehole when a suitable screw thread is not available for the cap 10 to be used.

The IGM apparatus 8 consists of a body portion 17 which is a self-contained unit meeting environmental rating IP-68, i.e. essentially waterproof. The IGM apparatus 8 comprises a top 30, an external tube 32 and a gas-porous end plug 34. The external diameter of tube 32 in this embodiment is approximately 40 mm allowing for it to be inserted into a typical borehole liner. In this embodiment of the invention, the length of tube 32 is 600 mm, but may be less.

The IGM apparatus 8 further comprises a gas inlet 36 controlled by an entry valve 38, which gas inlet leads to a water and particulate filter 40 for removing any excess moisture and/or particles from the ingressed gases. A suitable filter is an in-line particulate and moisture filter such as that available from Geotechnical Instruments of Sovereign House, Queensway, Leamington Spa, United Kingdom. A fluid flow path runs from the filter 40 to a gas pump 42 to a series of gas variable analysis chambers 44, 46, 48, 50 and then to an outlet valve 52.

Each analysis chamber has a corresponding analyser (not shown) for measuring a gas variable. Any suitable variable can be measured, the analysers typically being used to monitor hydrocarbons (especially methane), carbon dioxide, oxygen and hydrogen sulphide concentrations.

The IGM apparatus 8 further comprises a combined controller and memory 54 for controlling operation of the apparatus 8 and a power cell (battery) 56 making the operation of the apparatus 8 self-contained, i.e. not reliant on data communication with or power from an external source.

A gas pressure sensor 58 is connected to the gas flow path for measuring the gas pressure therein. A further gas pressure sensor 60 is provided for measuring atmospheric pressure through a hole 62 in the top 30. The gas pressure data from both sensors 58 and 60 is provided to the controller 54.

A vent pipe 64 is provided running through the apparatus 8 from the end-plug 34 to an outlet 66 through the top 30 to atmosphere. A vent pipe valve 68 is provided for the vent pipe 64 to control whether it is open to atmosphere.

Also shown is a water detector 70, which detects the presence or proximity of liquid water in the apparatus and upon such detection transmits a signal to the controller 54. A conductance sensor is used to determine a liquid water presence.

Further, a water level detector (not shown) can be connected to the bottom of the IGM apparatus and suspended therebelow in use into the borehole. As wired pressure transducer can be used.

The top 30 includes a connector 72 allowing data communication with a remote device and unit activation. Additionally, a pressure sensor can be attached here for monitoring borehole water level.

The IGM apparatus 8 is mounted in a borehole 2, within a borehole liner with the cap 10 providing a gas-tight seal.

Over time, gases will build up in the borehole 2. The IGM apparatus 8 is configured, specifically by programming of the controller 54, to automatically and periodically test a gas sample from the borehole. The process by which this is undertaken will now be described.

Entry valve 38 and exit valve 52 are both opened and pump 42 is activated to pump gas from the borehole through the gas flow path to ensure the gas variable sensors have an up to date gas sample from the borehole. The end-plug 34 and surrounding external area are the gas entry region, i.e. the area from which, in use, gas enters the apparatus. Moisture and particulates are removed by a filter 40.

A gas pressure measurement is made by gas pressure sensor 58 and a reference measurement of atmospheric pressure is made by pressure sensor 60. This data is stored in the controller/memory 54.

Entry and exit valves 38 and 52 are then closed.

Gas variable measurements are carried out by the gas sensors. Any appropriate variable can be monitored including one or more of the presence or absence of a particular gas, a gas concentration level, a gas pressure, moisture content in a gas, etc. The data from the gas variable measurements is stored in the controller/memory 54.

A timer in the controller 54 is re-set so that a subsequent periodic measurement can be made.

The data stored in controller/memory 54 can be downloaded over a hard-wired connection via the connector 72 or by wireless transmission. This connection can also be used to program the controller 54 to operate the apparatus 8 as desired. For instance, variables such as the frequency of sampling, whether sampling is regular or irregular, whether there should be a periodic venting to atmosphere, etc can be set.

On an ongoing basis if the water detector 70 detects the presence of water in the apparatus, a water detection signal is sent to the controller 54 which can take an appropriate step, such as deactivating the apparatus 8, transmitting an alert signal, illuminating a warning light etc. This can both protect the apparatus 8 from damage and avoid contaminated readings being made.

As gases build up in the borehole over time, it can be useful to open the borehole to atmosphere to reduce the pressure therein, but also to provide the opportunity to, in effect, restart the sampling operation by allowing the borehole to equilibriate to atmosphere. Thus, the base line for any monitoring can be re-set and an analysis of the variation of gas variables over time can be undertaken. The apparatus 8 can be configured to vent the borehole to atmosphere periodically or on instruction.

Thus, there is provided a portable, self-contained IGM apparatus that can be conveniently deployed in a borehole to take periodic data readings of gas variables in the borehole.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A self-contained in-borehole gas monitor (IGM) apparatus comprising a detector for measuring a gas variable, and a controller configured to automatically periodically use the detector to measure a gas variable, wherein the IGM apparatus further comprises a water detector configured to detect liquid water in or in the proximity of the IGM apparatus, and whereby the controller is configured to undertake a water detection response if liquid water is detected.

2. The IGM apparatus according to claim 1, wherein the IGM apparatus comprises a body portion for location within a borehole liner, which body portion is no more than 50 mm across.

3. The IGM apparatus according to claim 1, wherein the IGM apparatus comprises a power cell.

4. The IGM apparatus according to claim 1, wherein the IGM apparatus comprises a pressure sensor configured to measure atmospheric pressure in use.

5. The IGM apparatus according to claim 1, wherein the apparatus further comprises an on-board memory to store data generated by the IGM apparatus.

6. The IGM apparatus according to claim 1, wherein the IGM apparatus further comprises a filter before the entry to the gas flow path for filtering one or more of particulates and moisture.

7. The IGM apparatus according to claim 1, wherein the IGM apparatus comprises a gas flow path from a gas entry region to a gas variable sensor, an entry valve for controlling gas entry to the gas flow path, an exit valve for controlling gas exit from the end of the gas flow path distal from the gas entry and a pump for pumping borehole gas into the gas variable sensor.

8. The IGM apparatus according to claim 1, wherein the IGM apparatus is configured to take an atmospheric pressure reading and a borehole pressure reading at the same time.

9. The IGM apparatus according to claim 1, wherein the IGM apparatus comprises means for communicating data externally of the apparatus.

10. The IGM apparatus according to claim 1, wherein the IGM apparatus is portable.

11. A method for testing a gas sample in a borehole, comprising the steps of:
(a) providing a self-contained in-borehole gas monitor (IGM) apparatus according to claim 1; and
(b) using the IGM apparatus to automatically periodically measure a gas variable of the gas sample.

12. The IGM apparatus according to claim 1, wherein the IGM apparatus further comprises a through vent pipe and a vent valve for controllably opening the vent pipe, which vent pipe, when open, provides a gas flow path to the exterior of the IGM apparatus.

13. The IGM apparatus according to claim 12, wherein the IGM apparatus is configured to automatically periodically open the vent valve.

14. The IGM apparatus according to claim 1, wherein the IGM apparatus is configured to be locatable substantially within a borehole liner.

15. The IGM apparatus according to claim 14, wherein the IGM apparatus is configured whereby a majority of a volume of the IGM apparatus is locatable within a borehole liner.

16. The IGM apparatus according to claim 15, wherein the IGM apparatus is configured whereby over 75% of the volume of the IGM apparatus is locatable within a borehole liner.

17. The IGM apparatus according to claim 16, wherein the IGM apparatus is configured whereby over 90% of the volume of the IGM apparatus is locatable within a borehole liner.

18. The IGM apparatus according to claim 1, wherein the IGM apparatus comprises a gas flow path from a gas entry to a gas variable detector.

19. The IGM apparatus according to claim 18, wherein a gas pressure sensor is configured to measure the gas pressure in the gas flow path.

20. The IGM apparatus according to claim 18, wherein the gas flow path begins and ends at the gas entry region.

21. The IGM apparatus according to claim 18, wherein the IGM apparatus comprises an entry valve configuration to control gas flow into the gas flow path.

22. The IGM apparatus according to claim 18, wherein the IGM apparatus comprises an exit valve configured to control gas flow out of the gas flow path.

23. The IGM apparatus according to claim 1, wherein the IGM apparatus comprises a pump configured to pump gas from a gas entry region of the IGM apparatus to a gas variable detector.

24. The IGM apparatus according to claim 23, wherein the pump is configured to pump a tested gas away from the gas variable detector.

25. The IGM apparatus according to claim 1, wherein the IGM apparatus further comprises a borehole cap for securing the IGM apparatus to a borehole lining.

26. The IGM apparatus as claimed in claim 25, wherein there is provided a gas-tight seal between borehole cap and the borehole lining.

27. The IGM apparatus according to claim 1, wherein the IGM apparatus comprises a water level detector.

28. The IGM apparatus according to claim 27, wherein the water level detector comprises a wired pressure transducer.

29. The IGM apparatus according to claim 27, wherein the water level detector is connected to the bottom of the IGM apparatus to be suspended into the borehole in use.

* * * * *